United States Patent
Wei et al.

(10) Patent No.: US 11,122,458 B2
(45) Date of Patent: Sep. 14, 2021

(54) DATA TRANSMISSION METHOD AND APPARATUS IN A RADIO SYSTEM

(71) Applicant: Huawei Technologies Co., Ltd., Shenzhen (CN)

(72) Inventors: Anni Wei, Shenzhen (CN); Chunshan Xiong, Shenzhen (CN); Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 16/456,903

(22) Filed: Jun. 28, 2019

(65) Prior Publication Data
US 2019/0327635 A1    Oct. 24, 2019

Related U.S. Application Data

(63) Continuation of application No. PCT/CN2016/113864, filed on Dec. 30, 2016.

(51) Int. Cl.
*H04W 28/02* (2009.01)

(52) U.S. Cl.
CPC ... *H04W 28/0268* (2013.01); *H04W 28/0263* (2013.01)

(58) Field of Classification Search
CPC .............. H04W 28/0268; H04W 28/0263
See application file for complete search history.

(56) References Cited

U.S. PATENT DOCUMENTS

| | | | | |
|---|---|---|---|---|
| 2013/0250904 A1* | 9/2013 | Kang | ............ | H04B 7/0452 370/329 |
| 2014/0079060 A1* | 3/2014 | Healy | ............ | H04N 21/23 370/392 |

(Continued)

FOREIGN PATENT DOCUMENTS

CN    105766022 A    7/2016

OTHER PUBLICATIONS

Youn et al., "Efficient Reflective QoS Handling Mechanism to Minimize Control Signaling" Oct. 2016, U.S. Appl. No. 62/406,423, pp. 1-13 (Year: 2016).*

(Continued)

*Primary Examiner* — Christopher M Crutchfield
*Assistant Examiner* — Tito Q Pham
(74) *Attorney, Agent, or Firm* — Leydig, Voit & Mayer, Ltd.

(57) ABSTRACT

Embodiments of this application provide a data transmission method, with step including receiving, by user equipment, a first message, where the first message is used to instruct the user equipment to activate a reflective quality of service RQ mechanism; generating, by the user equipment, an implicit quality of service implicit QoS rule according to the RQ mechanism; receiving, by the user equipment, a second message, where the second message is used to instruct the user equipment to stop using the RQ mechanism; and stopping, by the user equipment, using the RQ mechanism, and deleting the implicit QoS rule. The user equipment receives the second message indicating that using of the RQ mechanism needs to be stopped, and deletes the implicit QoS rule, so as to implement switching between an explicit QoS rule and the implicit QoS rule, and flexibly configure a QoS rule for uplink data according to a policy of an operator.

13 Claims, 9 Drawing Sheets

(56) References Cited

U.S. PATENT DOCUMENTS

| | | | |
|---|---|---|---|
| 2014/0233380 A1 | 8/2014 | Kim et al. | |
| 2015/0063101 A1 | 3/2015 | Touati et al. | |
| 2019/0327635 A1* | 10/2019 | Wei | H04W 28/0268 |
| 2020/0275302 A1* | 8/2020 | Youn | H04W 28/0268 |

OTHER PUBLICATIONS

Youn et al., "Efficient Reflective QoS Handling Mechanism to Minimize Control Signaling" Nov. 2016, U.S. Appl. No. 62/418,799, pp. 1-18 (Year: 2016).*

"Interim Agreement on Reflective QoS," SA WG2 Meeting #117, Kaohsiung, Taiwan, S2-166186, pp. 1-4, 3rd Generation Partnership Project, Valbonne, France (Oct. 17-21, 2016).

"Interim agreement on reflective QoS," SA WG2 Meeting #S2-117, Kaohsiung City, Taiwan, S2-165800, pp. 1-3, 3rd Generation Partnership Project, Valbonne, France (Oct. 17-21, 2016).

"Update to Interim agreements on QoS framework—Reflective QoS," SA WG2 Meeting #S2-117, Kaohsiung City, Taiwan, S2-165653, pp. 1-3, 3rd Generation Partnership Project, Valbonne, France (Oct. 17-21, 2016).

"3rd Generation Partnership Project;Technical Specification Group Core Network and Terminals; 3GPP system—fixed broadband access network interworking; Stage 3 (Release 13)," 3GPP TS 24.139 V13.1.0, pp. 1-19, 3rd Generation Partnership Project, Valbonne, France (Jun. 2016).

"3rd Generation Partnership Project; Technical Specification Group Services and System Aspects; Study on Architecture for Next Generation System (Release 14)," 3GPP TR 23.799 V14.0.0, pp. 1-522, 3rd Generation Partnership Project, Valbonne, France (Dec. 2016).

"3rd Generation Partnership Project; Technical Specification Group Core Network and Terminals; Non-Access-Stratum (NAS) protocol for Evolved Packet System (EPS); Stage 3 (Release 14)," 3GPP TS 24.301 V14.2.0, pp. 1-445, 3rd Generation Partnership Project, Valbonne, France (Dec. 2016).

"3rd Generation Partnership Project; Technical Specification Group Core Network and Terminals; Mobile radio interface Layer 3 specification; Core network protocols; Stage 3 (Release 14)," 3GPP TS 24.008 V14.2.0, pp. 1-730, 3rd Generation Partnership Project, Valbonne, France (Dec. 2016).

"3rd Generation Partnership Project; Technical Specification Group Core Network and Terminals; Policy and Charging Control (PCC); Reference points (Release 14)," 3GPP TS 29.212 V14.2.0, pp. 1-269, 3rd Generation Partnership Project, Valbonne, France (Dec. 2016).

"RAN Consideration on the impact of QoS on NR CP," 3GPP TSG RAN WG2 Meeting #95bis, Kaohsiung, R2-166335, XP051150907, pp. 1-6, 3rd Generation Partnership Project, Valbonne, France (Oct. 10-14, 2016).

"Interim Agreement on Reflective QoS," SA WG2 Meeting #S2-118, Reno, Nevada, USA, S2-167243 (revision of S2-166873), XP051200164, pp. 1-6, 3rd Generation Partnership Project, Valbonne, France (Nov. 14-18, 2016).

"QoS: Clarifications and Updates of Solution 2.1," SA WG2 Meeting #118, Reno, Nevada, USA, S2-166392, XP051184951, pp. 1-16, 3rd Generation Partnership Project, Valbonne, France (Nov. 14-18, 2016).

* cited by examiner

DATA TRANSMISSION METHOD AND APPARATUS IN A RADIO SYSTEM

CROSS-REFERENCE TO RELATED APPLICATIONS

This application is a continuation of International Application No. PCT/CN2016/113864 filed on Dec. 30, 2016, the disclosure of which is hereby incorporated by reference in its entirety.

TECHNICAL FIELD

The present application relates to the field of communications technologies, and in particular, to a data transmission method and an apparatus.

BACKGROUND

As a basic network architecture, a wireless network bears increasing services. Behavior of a network depends on service characteristics and requirements, and scarcity of radio resources. The behavior of the network is defined by quality of service (QoS) rules in advance to implement access control, resource guarantee, and resource scheduling. For example, when a user is talking on a phone call, someone starts to download a file. Downloading a file preempts a communication resource for communication of the user due to scarcity of the radio resources, and consequently the ongoing phone call of the user is interrupted. In this case, it needs to ensure that a radio resource for a voice call has a higher resource utilization priority than that for downloading a file, so that the voice call proceeds normally when the radio resource is insufficient. Certainly, in a wireless network, for access of different services, different QoS rules need to be set to guarantee key services.

Reflective quality of service (Reflective QoS) is stipulated in 3GPP TS24.139. Reflective QoS means that QoS mechanisms used for uplink data and downlink data of a fixed-network user UE are the same. To simplify a QoS design of a 5G network, and reduce signaling overheads generated when a QoS rule is delivered from the network, a reflective QoS mechanism of the fixed network is introduced to the 5G network, and is referred to as an RQ mechanism for short. To be specific, the UE generates a reflective quality of service rule (reflective QoS rule) of an uplink service based on a downlink data stream, and performs uplink data transmission according to the reflective quality of service rule.

To simplify and reduce signaling overheads generated when a QoS rule is delivered to the UE from the network, a reflective QoS mechanism of the fixed network is introduced to the 5G network. In a reflective QoS scenario, QoS rule of uplink data of the UE is the same as that of downlink data of the UE. In the reflective QoS scenario, the UE automatically generates a QoS rule of the uplink data based on the downlink data, and the QoS rule includes a UL filter and a corresponding QoS parameter.

A QoS rule sent to the UE from the network by using signaling is referred to as an explicit quality of service rule (explicit QoS rule), and a QoS rule automatically generated by the UE according to the reflective QoS mechanism is referred to as an implicit quality of service rule (implicit QoS rule).

However, when a QoS policy changes, switching between a reflective QoS activation mechanism and a reflective QoS deactivation mechanism cannot be implemented, and the UE cannot manage the explicit QoS rule and the implicit QoS rule based on the switching.

SUMMARY

This application provides a data transmission method and an apparatus, so as to implement switching between a reflective QoS activation mechanism and a reflective QoS deactivation mechanism, and to implement management of an explicit QoS rule and an implicit QoS rule by UE.

According to an aspect, an embodiment of this application provides a data transmission method. The method includes: receiving, by user equipment, a first message, where the first message is used to instruct the user equipment to activate a reflective quality of service RQ mechanism; generating, by the user equipment, an implicit quality of service implicit QoS rule according to the RQ mechanism; receiving, by the user equipment, a second message, where the second message is used to instruct the user equipment to stop using the RQ mechanism; and stopping, by the user equipment, using the RQ mechanism, and deleting the implicit QoS rule. The user equipment receives the second message indicating that using of the RQ mechanism needs to be stopped, and deletes the implicit QoS rule, so as to implement switching between an explicit QoS rule and the implicit QoS rule, and flexibly configure a QoS rule for uplink data according to a policy of an operator. Moreover, a QoS rule stored and maintained in the UE can be effectively managed, and a storage resource can be released in a timely manner, thereby avoiding overload of storage space of the UE.

In a possible design, the first message includes a quality of service indication RQI data packet, the RQI data packet is a data packet carrying an RQI, and the RQI is used to instruct the user equipment to activate the reflective quality of service RQ mechanism. The second message is a non-RQI data packet, where the non-RQI data packet is a data packet carrying no RQI. A manner of performing indication based on whether a data packet carries an RQI is an in-band manner, and this manner further reduces control plane messages, and saves network resources.

In a possible design, the first message and the second message may alternatively be signaling messages and are sent by a control plane network element.

In a possible design, the user equipment receives an install explicit quality of service rule install explicit QoS rule message, where the install explicit QoS rule message is used to instruct the user equipment to process an uplink data packet according to an explicit quality of service explicit QoS rule; and the user equipment processes the uplink data packet according to the explicit QoS rule. This implements dynamic updating of the RQ mechanism used by the UE.

According to another aspect, an embodiment of this application provides a data transmission method. The method includes: after a user plane network element receives a QoS rule sent by a control plane network element, sending, by the user plane network element, a first message to user equipment, where the first message is used to instruct the user equipment to activate a reflective quality of service RQ mechanism; and after the user plane network element receives an updated QoS rule sent by the control plane network element, sending, by the user plane network element, a second message to the user equipment, where the second message is used to instruct the user equipment to stop using the RQ mechanism.

In a possible design, after the user plane network element sends the first message to the user equipment, the user plane network element receives an uplink data packet, and verifies whether the QoS rule is used for the uplink data packet. Verification can further ensure accuracy of executing the QoS rule and prevent the UE from misusing the QoS rule.

According to still another aspect, an embodiment of this application provides a data transmission method, including: sending, by a control plane network element, a first message to user equipment, where the first message is used to instruct the user equipment to activate a reflective quality of service RQ mechanism; and sending, by the control plane network element, a second message to the user equipment, where the second message is used to instruct the user equipment to stop using the RQ mechanism. In this way, a QoS rule used by the UE is managed by directly using a control plane.

According to still another aspect, an embodiment of this application provides user equipment, where the UE has functions of implementing actions of the user equipment in the foregoing method designs. The functions may be implemented by hardware, or may be implemented by executing corresponding software by hardware. The hardware or software includes one or more modules corresponding to the foregoing functions. The module may be software and/or hardware.

According to still another aspect, an embodiment of this application provides a user plane apparatus, where the user plane apparatus has functions of implementing actions of the user plane network element in the foregoing method designs. The functions may be implemented by hardware, or may be implemented by executing corresponding software by hardware. The hardware or software includes one or more modules corresponding to the foregoing functions. The module may be software and/or hardware.

According to still another aspect, an embodiment of this application provides a control plane apparatus, where the control plane apparatus has functions of implementing actions of the control plane network element in the foregoing method designs. The functions may be implemented by hardware, or may be implemented by executing corresponding software by hardware. The hardware or software includes one or more modules corresponding to the foregoing functions. The module may be software and/or hardware.

According to yet another aspect, an embodiment of the present application provides a computer storage medium, configured to store a computer software instruction used by the foregoing UE, where the computer software instruction includes a program designed for executing the foregoing aspects.

According to yet another aspect, an embodiment of the present application provides a computer storage medium, configured to store a computer software instruction used by the foregoing user plane apparatus, where the computer software instruction includes a program designed for executing the foregoing aspects.

According to yet another aspect, an embodiment of the present application provides a computer storage medium, configured to store a computer software instruction used by the foregoing control plane apparatus, where the computer software instruction includes a program designed for executing the foregoing aspects.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may derive other drawings from these accompanying drawings without creative efforts.

DESCRIPTION OF EMBODIMENTS

The present application provides a data transmission method and an apparatus. User equipment receives a first message, where the first message is used to instruct to use an RQ mechanism for a data stream; the user equipment generates an implicit QoS rule according to the RQ mechanism; the user equipment receives a second message, where the second message is used to indicate that using of the RQ mechanism needs to be stopped; and the user equipment deletes the implicit QoS rule.

In the embodiments of the present application, the user equipment receives the second message indicating that the using of the RQ mechanism needs to be stopped, and deletes the implicit QoS rule, so as to implement switching between an explicit QoS rule and the implicit QoS rule, and flexibly configure a QoS rule for uplink data according to a policy of an operator. Moreover, a QoS rule stored and maintained in the UE can be effectively managed, and a storage resource can be released in a timely manner, thereby avoiding overload of storage space of the UE.

In the embodiments of the present application, a reflective quality of service parameter may include a quality of service indication RQI granularity, a reflective quality of service rule priority (RQP), and a reflective quality of service indication (Reflective QoS Indication, RQI).

The user equipment UE receives a message that includes a correspondence between a next-generation quality of service index (NQI) and an RQI and that is sent by a control plane (CP) network element, and a message sent by a user plane (UP) network element, so that the user equipment can generate a quality of service rule based on the messages received from the control plane network element and the user plane network element. When uplink data received by the UE meets the quality of service rule, the UE transmits the uplink data by using the quality of service rule.

The message sent by the user plane network element may carry no RQI. When receiving the message sent by the user plane network element, the user equipment obtains an NQI used when the user plane network element sends the message, and based on the correspondence that is between an NQI and an RQI and that is received from the control plane network element, the user equipment activates the RQ mechanism and generates the quality of service rule.

The message sent by the user plane network element may carry an RQI. When receiving the message sent by the user plane network element, the user equipment activates the RQ mechanism and generates the quality of service rule for transmitting the uplink data.

Figure 1:
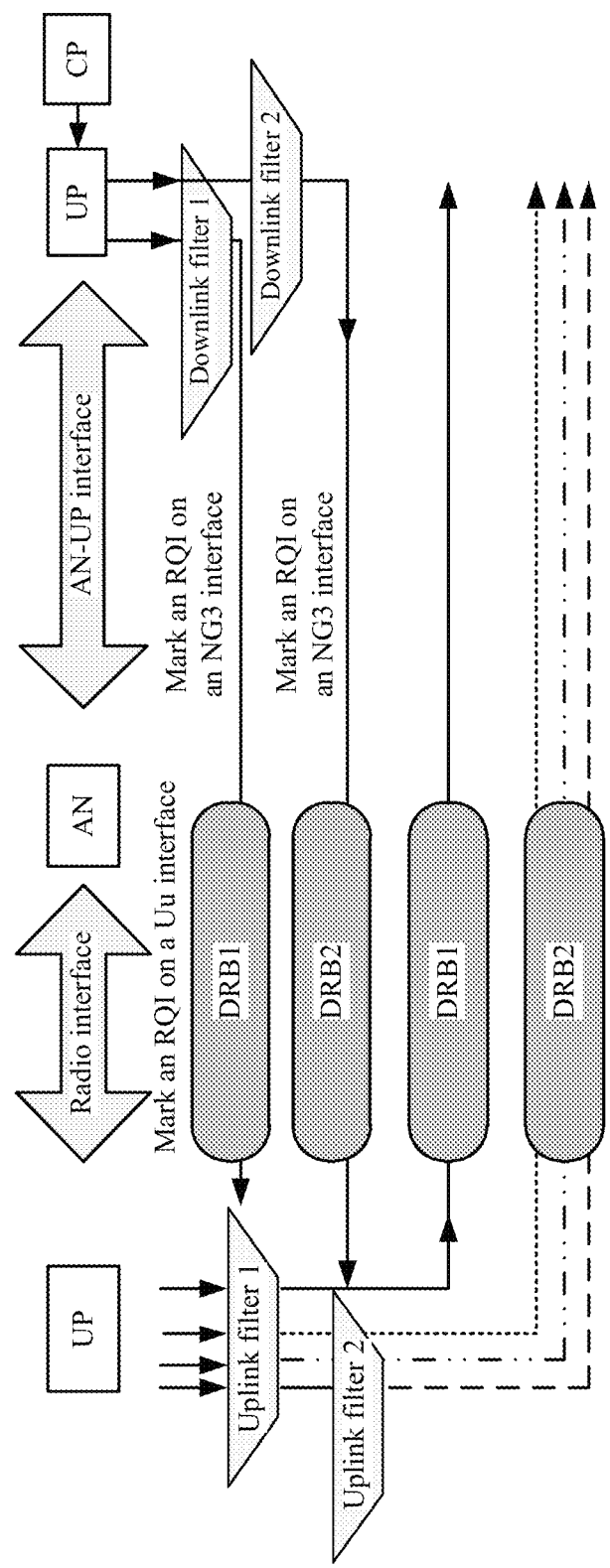
FIG. 1 is a schematic diagram of uplink data transmission based on reflective QoS according to an embodiment of the present application.

FIG. 1 is a schematic diagram of uplink data transmission based on reflective QoS according to an embodiment of the present application. A control plane network element CP sends a quality of service rule (QoS rule) to a user plane network element UP, where the quality of service rule includes a downlink packet filter, a next-generation quality of service index (NextGen QoS index, NQI), a reflective quality of service indication (Reflective QoS Indication, RQI), and RQI mark indication information. The user plane network element sends a message to user equipment UE based on the received quality of service rule, where the message is filtered by a downlink filter; determines corresponding quality of service, for example, a next-generation quality of service index NQI; and sends the message to the UE by using a corresponding DRB in an access network. As shown in FIG. 1, the message is sent to the UE by using a DRB 1 and a DRB 2. The message may include the reflective quality of service indication RQI that is used to instruct the UE to activate an RQ mechanism.

In addition, the message may be a signaling plane message, or may be a user plane message. The signaling plane message is an instruction sent to the user equipment by a core network. The user plane message is data sent to the user equipment by the core network, and the RQI may be configured in a header of a data packet.

After receiving the message sent by the UP, the UE activates the RQ mechanism based on the RQI in the message, and determines, based on the message, a quality of service rule for transmitting uplink data. The quality of service rule includes information such as an uplink filter.

When the UE needs to transmit uplink data, the UE filters the to-be-transmitted uplink data by using the uplink filter. If there is uplink data matching the uplink filter, the UE uses a DRB corresponding to the uplink filter to perform uplink data transmission. As shown in FIG. 1, the UE performs uplink data transmission by using the DRB2.

It should be noted that uplink data and downlink data may be transmitted by using an access network (AN) in FIG. 1. An interface between the UE and the AN is referred to as a radio interface. An interface between the AN and the UP may be referred to as an AN-UP interface. In an existing LTE network, an interface between the AN and an S-GW is an Si interface, and an interface between the S-GW and a P-GW is an S5/S8 interface.

In this embodiment of the present application, a message that carries an RQI and that is sent to the UE by the UP may be transmitted through an NG3 interface between the UP and the AN, through a Uu interface between the AN and the UE, or through an NG3 bearer and a Uu bearer.

Figure 2:
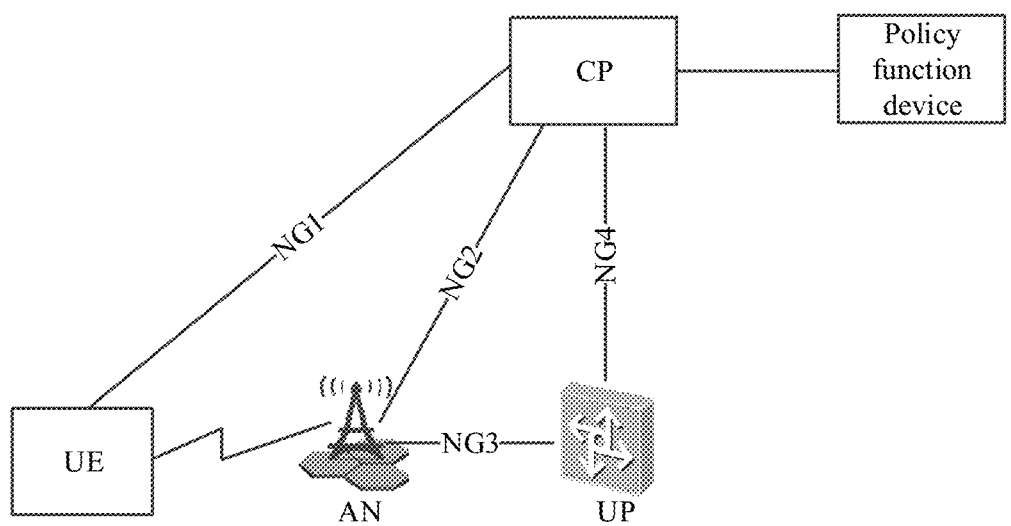
FIG. 2 is an architectural diagram of a communications network system according to an embodiment of the present application.

FIG. 2 is an architectural diagram of a communications network system according to an embodiment of the present application. As shown in FIG. 2, the system includes user equipment UE, a control plane network element CP, a user plane network element UP, an access network AN, and a policy function device, where the policy function device may also be referred to as a policy entity.

The control plane network element is responsible for mobility management and control policy delivery in a mobile network, for example, delivering a quality of service rule for packet processing to a user plane, to instruct the user plane to filter to-be-sent uplink data and mark an RQI according to the quality of service rule. The control plane network element CP may be a mobility management entity (MME), a gateway control plane, or all or some of control functions formed through integration of the mobility management entity and the gateway control plane.

The user plane network element UP is configured to be responsible for data processing and forwarding. The user plane network element may be a forwarding plane function of a PDN GW, a forwarding plane function of an S-GW, a router, a switch, or another physical or virtual device.

The access network AN provides a wireless access service for the user equipment, and includes but is not limited to an evolved NodeB (eNodeB), an access point (AP), or the like.

The user equipment UE is a network terminal device, including but not limited to a mobile phone, a network access device, an Internet of Things terminal device, or the like.

In a specific embodiment of the present application, a core network (CN) includes a user plane function (UPF) and a control plane function (CPF). QoS rules delivered to the UE and the UPF by the CPF are referred to as explicit QoS rules or signaled quality of service rules (signaled QoS rules), and QoS rules generated by the UE based on reflective QoS are referred to as implicit QoS rules or derived quality of service rules (derived QoS rules).

In a reflective QoS scenario, the UPF in the core network includes the QoS rules sent by the CPF. The UPF includes a QoS rule group, where the QoS rule group includes a plurality of QoS rules, and each QoS rule further includes a packet filter and a QoS parameter. For example, the parameter may be an NQI (NextGen QoS index, next-generation network (5G) QoS index) or a QoS class identifier (QCI). The packet filter includes a DL packet filter and a UL packet filter.

The UPF filters downlink data according to the plurality of QoS rules in the QoS rule group. For example, the packet filter is a 5-tuple, matching the DL packet filter in the packet filter with a 5-tuple included in the downlink data is performed. When the DL packet filter matches the 5-tuple included in the downlink data, the downlink data is sent according to QoS information in the QoS rules.

In a specific embodiment of the present application, each QoS rule is corresponding to one QoS processing rule. The different QoS processing rules provide different QoS assurance for a data stream, for example, a scheduling policy, a queue management policy, a rate adjustment policy, and an radio link control (RLC) configuration.

In this embodiment of the present application, the user equipment receives a second message indicating that using of an RQ mechanism needs to be stopped, and deletes an implicit QoS rule, so as to implement switching between an explicit QoS rule and the implicit QoS rule, and flexibly configure a QoS rule for uplink data according to a policy of an operator. Moreover, a QoS rule stored and maintained in the UE can be effectively managed, and a storage resource can be released in a timely manner, thereby avoiding overload of storage space of the UE.

Figure 3:
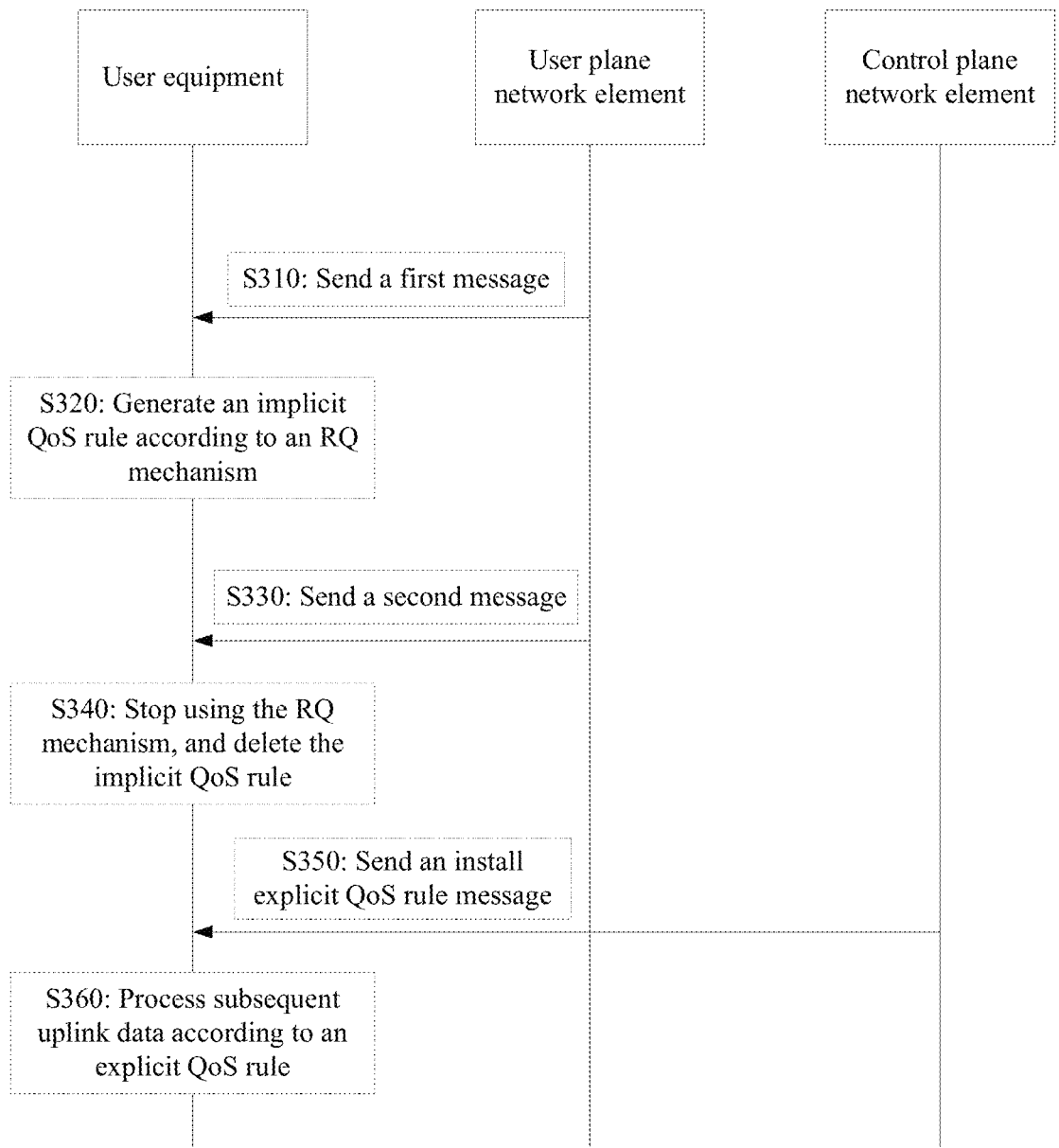
FIG. 3 is a flowchart of a data transmission method based on reflective QoS according to an embodiment of the present application.

FIG. 3 is a flowchart of a data transmission method according to an embodiment of the present application. As shown in FIG. 3, the method 300 includes the following steps:

S310: User equipment receives a first message.

Optionally, the first message includes a data packet sent to the user equipment by a user plane network element, and the data packet is transmitted through quality of service corresponding to a quality of service indication NQI. The data packet may carry a reflective quality of service indication RQI that is used to instruct the user equipment to activate a reflective quality of service RQ mechanism. The data packet carrying an RQI is an RQI data packet. The RQI is used to instruct the user equipment to activate the reflective quality of service RQ mechanism. In this embodiment of the present application, a quality of service rule sent by a control plane network element and referenced by the user plane network element includes one or more of a downlink packet filter, a next-generation quality of service index (NextGen QoS index, NQI), a reflective quality of service indication RQI, and an RQI mark indication message. A downlink packet filter includes content such as a source IP address, a destination IP address, a source IP port number, a destination IP port number, and a protocol type.

The user plane network element sends the first message to the user equipment according to the QoS rule. Specific steps are as follows: The user plane network element filters to-be-sent downlink data by using a downlink packet filter, selects specific quality of service for the to-be-sent downlink data, and adds or configures an RQI to a header of a to-be-sent downlink data packet based on RQI mark indication information, so as to obtain the first message, where the first message is also referred to as an RQI data packet.

The RQI is added or configured to the header of the downlink data packet. The RQI may be used to identify an RQI activation mechanism and RQI deactivation by using two bits. For example, "10" or "01" is used to identify RQI mechanism activation. When an RQI field of a data packet received by the UE includes "10" or "01", it indicates that the UE needs to activate the RQ mechanism, and the UE automatically generates an implicit QoS rule according to the RQ mechanism.

Optionally, the RQI may alternatively be used to identify an RQI activation mechanism and RQI deactivation by using one bit. For example, "1" is used to identify RQI mechanism activation. When an RQI field of a data packet received by the UE includes "1", it indicates that the UE needs to activate the RQ mechanism, and the UE automatically generates an implicit QoS rule according to the RQ mechanism.

S320: The user equipment generates an implicit QoS rule according to an RQ mechanism.

Based on a correspondence between an NQI and an RQI, and an NQI corresponding to a bearer on which a downlink data packet received by the user equipment exists, the user equipment determines to activate the RQ mechanism, and generates, according to the RQ mechanism, a quality of service rule for transmitting uplink data. Optionally, if the generated quality of service rule is not included in an existing quality of service rule of the user equipment, the user equipment needs to generate a new quality of service rule, where the quality of service rule may be referred to as an implicit quality of service rule (implicit QoS rules). The implicit quality of service rule generated by using the method may be referred to as a control plane implicit quality of service rule (C-Plane implicit QoS rules). For example, an IP 5-tuple of the downlink data is a source IP address Y, a destination IP address X, a source IP port number B, a destination IP port number A, and a protocol type C. An IP 5-tuple of an uplink packet filter obtained after inversion of the IP 5-tuple of the downlink data is a source IP address X, a destination IP address Y, a source IP port number A, a destination IP port number B, and the protocol type C.

The user equipment generates the implicit quality of service rule according to the RQ mechanism and based on the IP 5-tuple of the downlink data, and a quality of service indication NQI or a QoS classification identifier (QCI) corresponding to obtained transmission quality of service, where the quality of service rule includes a correspondence between an uplink packet filter and the quality of service indication NQI. The uplink packet filter includes parameter information of an IP 5-tuple used for filtering uplink data, and includes content such as a source IP address, a destination IP address, a source IP port number, a destination IP port number, and a protocol type.

It should be noted that in this embodiment of the present application, the quality of service indication NQI is represented as an QoS quality of service indication in a 5G network, may be one or more parameters, for example, a combination of a forwarding priority, a latency, and a packet loss rate, and is similar to a QoS classification identifier in an EPS.

It should be noted that in this embodiment of the present application, the uplink packet filter may be referred to as an uplink filter (UL filters) for short. In addition, a newly generated uplink filter may be referred to as a temporary uplink filter.

It should be further noted that in this embodiment of the present application, the generated implicit quality of service rule may further include a reflective quality of service priority RQP, to indicate a matching priority sequence of C-Plane implicit QoS rules.

Optionally, if the quality of service rule generated by the user equipment according to the RQ mechanism is included in an existing quality of service rule of the user equipment, a new quality of service rule does not need to be re-generated.

When receiving uplink data that matches the newly generated uplink filter or an existing uplink filter, the user equipment uses a quality of service rule corresponding to the uplink filter to transmit the uplink data, so as to implement uplink data transmission of the user equipment according to the RQ mechanism.

S330: The user equipment receives a second message, where the second message is used to instruct the user equipment to stop using the RQ mechanism.

The user plane network element receives an updated QoS rule sent by the control plane network element, and the user plane network element processes a corresponding downlink data packet as the second message according to the updated QoS rule. Compared with the QoS rule sent by the control plane network element in step S320, there is an update in the updated QoS rule, and the update may be an update on any parameter in the QoS rule, for example, a filter, a priority, or the NQI. The second message may include a data packet sent to the user equipment by the user plane network element. Different from the first message, the data packet carries no RQI, that is, the data packet carrying no RQI is a non-RQI data packet. If the second message received by the user equipment carries no RQI indication, the user equipment stops using the RQ mechanism.

The user plane network element sends the second message according to the updated QoS rule. The user plane network element filters the to-be-sent downlink data by using a downlink packet filter, selects specific quality of service for the to-be-sent downlink data, and based on the RQI mark indication information, does not add or configure an RQI to a header of a to-be-sent downlink data packet any longer. In other words, in this embodiment, the second message is a data packet carrying no RQI, or may be referred to as a non-RQI data packet.

If a user plane network element side has no to-be-sent downlink data packet, the user plane network element constructs a null downlink data packet, and then processes the null downlink data packet as the foregoing second message.

For a generation process of the second message, refer to processing of first message in the corresponding step S310. When the RQI included in the first information is used to identify the RQI activation mechanism by using two bits. For example, "10" or "01" is used to identify the RQI mechanism activation, "11" or "00" may be used to identify a downlink data packet, so as to form second second information, that is, a non-RQI data packet carrying no RQI. When an RQI field of the data packet received by the UE includes "11" or "00", it indicates that the UE needs to deactivate the RQ mechanism, and delete the automatically generated implicit QoS rule. When the RQI included in the first information is used to identify the RQI activation mechanism by using one bit. For example, "1" is used to identify the RQI mechanism activation, the second message may be used to identify a downlink data packet by using "0", so as to form the second second information, that is, a non-RQI data packet carrying no RQI. When the RQI field of the data packet received by the UE includes "0", it indicates that the UE needs to deactivate the RQ mechanism, and delete the automatically generated implicit QoS rule. It should be noted that two bits are used to identify the RQI activation mechanism, "10" or "01" is merely an example, or "11" or "00" may be used. One bit is used to identify the RQI activation mechanism, "1" is merely an example, or "0" may be used. Correspondingly, RQI deactivation is different from RQI activation.

S340: The user equipment stops using the RQ mechanism, and the user equipment may further delete the implicit QoS rule generated in S320.

The UE no longer uses the RQ mechanism to process the uplink data, and the user equipment may further delete the implicit QoS rule.

The user equipment deletes the implicit QoS rule generated in S320. The user equipment UE receives a remove QoS rule message, where the remove QoS rule message is used to instruct the user equipment to perform a corresponding operation on the implicit QoS rule, where the operation may be deleting the implicit QoS rule. Alternatively, the remove QoS rule message may be referred to as a disable QoS rule message or a modify QoS rule (modify implicit QoS rule) message.

Optionally, the method in this embodiment may further include the following step:

S350: The user equipment receives an install explicit quality of service rule (Install explicit QoS rule) message, where the install explicit QoS rule message may be sent by the control plane network element, and the install explicit QoS rule message is used to instruct the user equipment to process an uplink data packet according to an explicit QoS rule.

If the UE receives the install explicit QoS rule message delivered by the control plane network element, the UE performs processing on subsequent uplink data according to the explicit QoS rule, where the processing is performing matching on the data based on a filter in the explicit QoS rule, and transmits the data based on an NQI in the explicit QoS rule. Otherwise, the UE performs processing on the data according to a current QoS rule. Optionally, the method in this embodiment may further include the following step:

S360: The user plane network element receives an uplink data packet sent by the UE, and verifies, based on an updated QoS rule, whether a correct QoS rule is used for the uplink data packet. Verification can further ensure accuracy of executing the QoS rule and prevent the UE from misusing the QoS rule.

Figure 4:
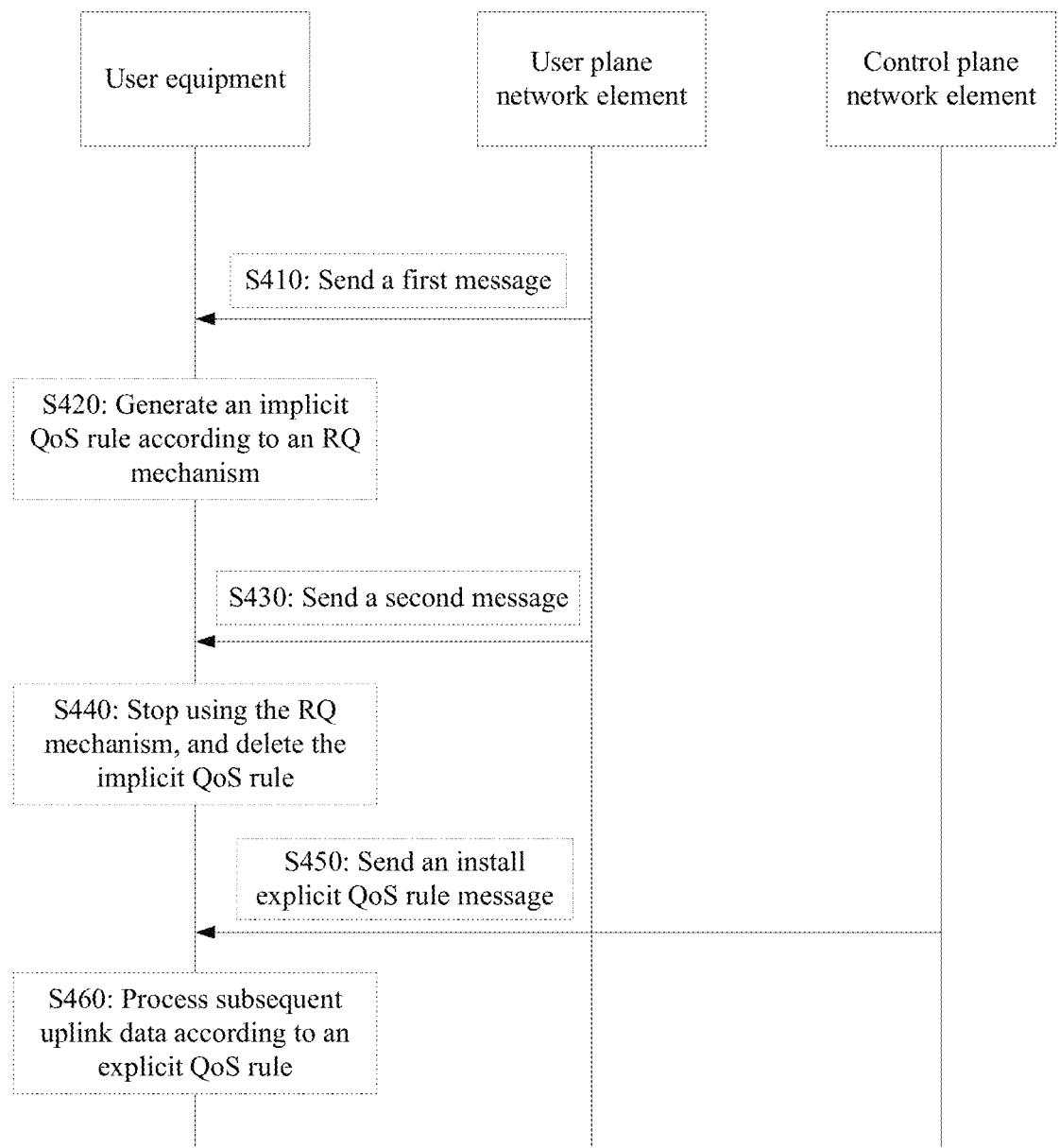
FIG. 4 is a flowchart of another data transmission method based on reflective QoS according to an embodiment of the present application.

In the embodiments of the present application, the user equipment receives the second message indicating that the using of an RQ mechanism needs to be stopped, and deletes an implicit QoS rule, so as to implement switching between an explicit QoS rule and the implicit QoS rule, and flexibly configure a QoS rule for uplink data according to a policy of an operator. Moreover, a QoS rule stored and maintained in the UE can be effectively managed, and a storage resource can be released in a timely manner, thereby avoiding overload of storage space of the UE. FIG. 4 shows another embodiment of this application. In the embodiment shown in FIG. 4, a first message received by UE is different from that in the embodiment shown in FIG. 3. In S410, the UE receives the first message, where the first message received by the UE is a signaling message sent by a control plane network element. The first message is a QoS rule message, where the QoS rule message may include an install implicit QoS rule message, and the install implicit QoS rule message includes an RQI granularity message. The RQI granularity message is used to instruct to use an RQ mechanism for a data stream corresponding to a specific NQI or a stream of a specific session or a stream corresponding to a specific 5-tuple, or may be further used to indicate a priority of an implicit QoS rule generated according to the RQ mechanism. After receiving the first message, the UE automatically generates the implicit QoS rule according to the RQ mechanism. It should be noted that, for specific steps of automatically generating the implicit QoS rule by the UE according to the RQ mechanism, refer to S320 in the foregoing embodiment, and details are not described herein again.

In this embodiment, in S420, the UE receives a second message. Different from the second message in S330 in the foregoing embodiment, the second message is a signaling message and is sent by the control plane network element. The second message is a remove QoS rule message, or may be referred to as a disable QoS rule message, or a modify implicit QoS rule message. The second message indicates that packet filter information needs to be deleted. In step S430, after receiving the second message, the user equipment stops using the RQ mechanism, and the user equipment may further delete the previously generated implicit QoS rule that includes a packet filter. For a step of deleting the implicit QoS rule, refer to step S340 in the previous embodiment, and details are not described herein again.

In step S450, if the UE receives an install explicit QoS rule message delivered by a CPF, subsequent uplink data is processed according to the explicit QoS rule. For details thereof, refer to step S350 in the embodiment shown in FIG. 3, and details are not described herein again.

A user plane network element receives an uplink data packet sent by the UE, and verifies, based on an updated QoS rule, whether a correct QoS rule is used for the uplink data packet. Verification can further ensure accuracy of executing the QoS rule and prevent the UE from misusing the QoS rule.

It should be noted that in the embodiment shown in FIG. 3 of this application, the first message and the second message are sent by the user plane network element, and in the embodiment shown in FIG. 4 of this application, the first message and the second message are sent by the control plane network element. This may also be implemented in another implementation. For example, the user plane network element sends the first message, and the control plane network element sends the second message; or the control plane network element sends the first message, and the user plane network element sends the second message.

Figure 5:
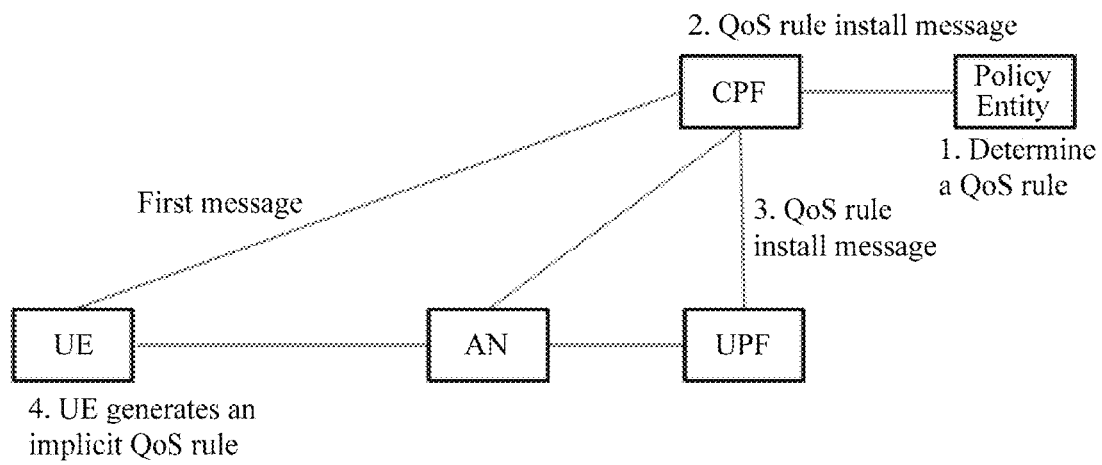
FIG. 5 is a flowchart of an install configuration method for another QoS rule according to an embodiment of the present application.

With reference to the embodiments shown in FIG. 3 and FIG. 4, FIG. 5 is a flowchart of an install configuration method for a QoS rule according to an embodiment of the present application. The install configuration method shown in FIG. 5 is implemented by using a signaling message, and steps of the method are as follows:

1. A policy entity determines a QoS rule.
2. The policy entity performs install configuration of the QoS rule on a control plane network element in a network by using a QoS rule-install message.
3. A CPF sends a QoS rule-install message, so as to implement install configuration of the QoS rule on a UPF.
4. UE automatically generates an implicit QoS rule according to an RQ mechanism.

According to the install configuration method for a QoS rule shown in this embodiment, with reference to the embodiment shown in FIG. 3 or FIG. 4, after step 3, a user plane network element may send a first message, so that the UE automatically generates the implicit QoS rule according to an RQ mechanism indicated in the first message. For specific implementation of automatically generating the implicit QoS rule by the UE according to the RQ mechanism in step 4, refer to related descriptions of implicit QoS rule generation in the embodiments shown in FIG. 3 and FIG. 4. Details are not described herein again.

Figure 6:
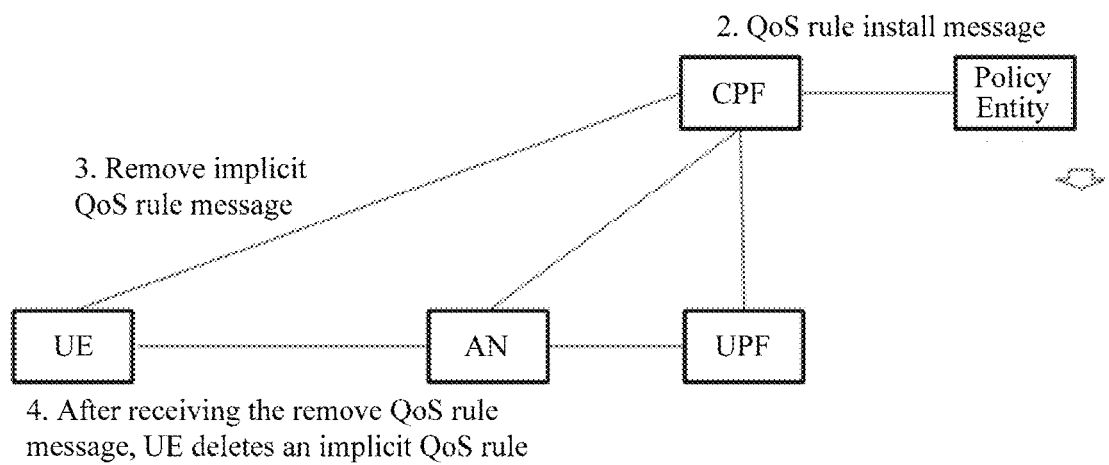
FIG. 6 is a flowchart of an updating method of a QoS rule according to an embodiment of the present application.

FIG. 6 is a flowchart of an updating method of a QoS rule according to an embodiment of this application. Steps of the updating method are as follows:

1. A policy entity determines to delete a specific packet filter from a TFT (traffic flow template) of the QoS rule.
2. The policy entity performs install configuration of the QoS rule on a control plane network element in a network by using a QoS rule-install message, where a parameter of the QoS rule-install message is updated compared with the first message in another method embodiment, that is, an install implicit QoS rule, and the updated parameter may be at least one of the following:

{QoS-Rule-Name}
*[Flow-Information]
[QoS-Information]
[Precedence]
*[Required-Access-Info]
[Sharing-Key-DL]
[Sharing-Key-UL]

3. A CPF sends a remove implicit QoS rule message to UE, where the remove implicit QoS rule message is used to indicate that the UE needs to delete packet filter information.
4. After receiving the remove implicit QoS rule message, the UE performs a corresponding operation on an implicit QoS rule, where the operation may be deleting an implicit QoS rule including the packet filter.

In this embodiment, the updating method of the QoS rule may be used to implement deleting the implicit QoS rule by the user equipment in the embodiments shown in FIG. 3 and FIG. 4.

In addition, after the policy entity performs install configuration of the QoS rule on the control plane network element in the network by using the QoS rule-install message, the CPF may further send a QoS rule-install message to a UPF to update the QoS rule. In this embodiment, Flow-Information of a QoS rule definition is updated to TFT information without the packet filter.

In an RQ mechanism of 5G, the CPF needs to send the remove implicit QoS rule message by performing step 3 to update the implicit QoS rule, because the implicit QoS rule is automatically generated by the UE, but a CPF side does not know the packet filter information. If the CPF needs to delete the packet filter information, content information (such as a 5-tuple) carrying the packet filter can only be determined in the remove implicit QoS rule message. After receiving the remove implicit QoS rule message (the message indicates that the packet filter information needs to be deleted), the UE deletes the corresponding implicit QoS rule, so as to optimize QoS rule management inside the UE, release storage space of the UE in a timely manner, and save resources.

Figure 7:
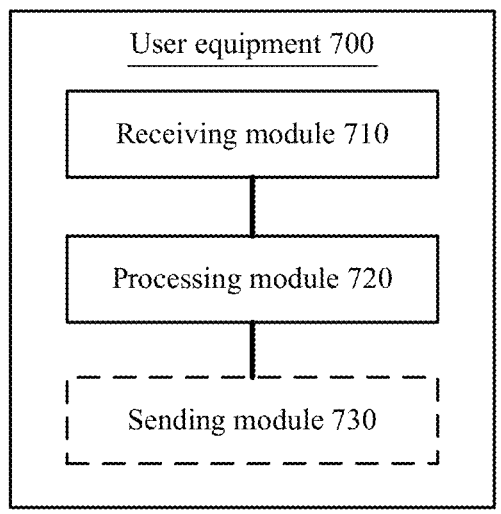
FIG. 7 is a schematic diagram of user equipment according to an embodiment of the present application.

FIG. 7 shows user equipment 700 according to a specific embodiment of the present application, where the user equipment 700 may implement functions of the user equipment in the foregoing method embodiments. Therefore, the user equipment 700 can also achieve beneficial effects of the foregoing method embodiments. The hardware or software includes at least one of modules corresponding to the foregoing functions. As shown in FIG. 7, the user equipment 700 specifically includes:

a receiving module 710, configured to receive a first message, where the first message is used to instruct the user equipment to activate a reflective quality of service RQ mechanism; and a processing module 720, configured to generate an implicit QoS rule according to the RQ mechanism.

The receiving module 710 is further configured to receive a second message, where the second message is used to instruct the user equipment to stop using the RQ mechanism.

The processing module 720 is further configured to stop using the RQ mechanism, and delete the implicit QoS rule.

Optionally, the first message includes an RQI data packet, where the RQI data packet is a data packet carrying an RQI, and the RQI is used to instruct the user equipment to activate the reflective quality of service RQ mechanism.

The second message is a non-RQI data packet, where the non-RQI data packet is a data packet carrying no RQI.

Optionally, the first message and the second message are signaling messages.

The receiving module 710 is further configured to receive an install explicit QoS rule message, where the install explicit QoS rule message is used to instruct the user equipment to process an uplink data packet according to an explicit QoS rule. The processing module 720 is further configured to process the uplink data packet according to the explicit QoS rule.

The receiving module 710 is further configured to receive a remove implicit QoS rule message before the processing module deletes the implicit QoS rule.

The user equipment may further include a sending module 730, configured to send a data packet, where the data packet is an uplink data packet.

Figure 8:
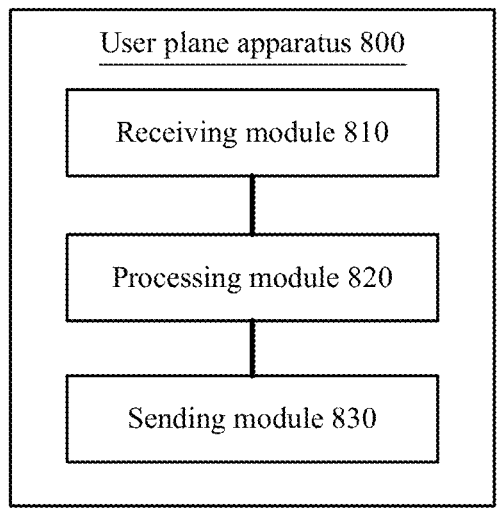
FIG. 8 is a schematic diagram of a user plane apparatus according to an embodiment of the present application.

FIG. 8 is a user plane apparatus 800 according to a specific embodiment of the present application, where the user plane apparatus may implement functions of the user plane network element in the foregoing method embodiments. Therefore, the user plane apparatus 800 can also achieve beneficial effects of the foregoing method embodiments. The hardware or software includes at least one of modules corresponding to the foregoing functions. As shown in FIG. 8, the user plane device specifically includes:

a receiving module 810, where the receiving module 810 is configured to receive a QoS rule sent by a control plane apparatus;

a processing module 820, configured to generate a first message after the receiving module 810 receives the QoS rule sent by the control plane apparatus, where the first message is used to instruct the user equipment to activate a reflective quality of service RQ mechanism; and a sending module 830, where the sending module 830 is configured to send the first message to the user equipment.

The receiving module 810 is further configured to receive an updated QoS rule sent by the control plane apparatus; the processing module is further configured to generate a second message after the receiving module 810 receives the updated QoS rule sent by the control plane apparatus, where the second message is used to instruct the user equipment to stop using the RQ mechanism; and the sending module 830 is further configured to send the second message to the user equipment.

Optionally, the receiving module 810 is further configured to: after the sending module 830 sends the first message to the user equipment, receive an uplink data packet sent by the user equipment. The processing module 820 is configured to verify whether the QoS rule is used for the uplink data packet.

Optionally, after the sending module 830 sends the second message to the user equipment, the receiving module 810 is further configured to receive the uplink data packet sent by the user equipment. The processing module is configured to verify whether the updated QoS rule is used for the uplink data packet.

Optionally, the first message includes an RQI data packet, the RQI data packet is a data packet carrying an RQI, and the RQI is used to instruct the user equipment to activate the reflective quality of service RQ mechanism.

The second message is a non-RQI data packet, where the non-RQI data packet is a data packet carrying no RQI.

The processing module 810 is further configured to construct a null data packet as the data packet.

Optionally, the first message and the second message are signaling messages.

Figure 9:
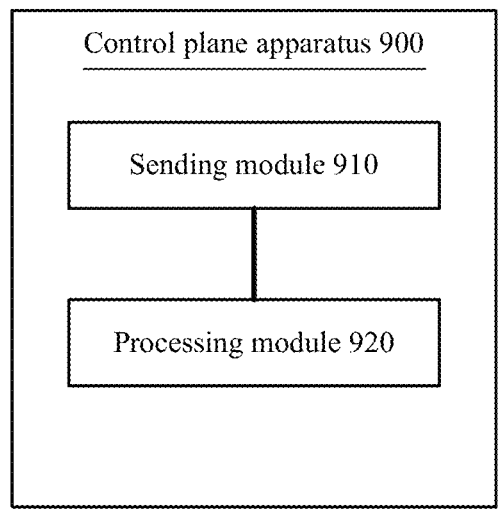
FIG. 9 is a schematic diagram of a control plane apparatus according to an embodiment of the present application.

FIG. 9 is a control plane apparatus 900 according to a specific embodiment of the present application, where the control plane apparatus may implement functions of the control plane network element in the foregoing method embodiments. Therefore, the control plane apparatus 900 can also achieve beneficial effects of the foregoing method embodiments. The hardware or software includes at least one of modules corresponding to the foregoing functions.

As shown in FIG. 9, the control plane apparatus 900 specifically includes:

a sending module 910, configured to send a first message to user equipment, where the first message is used to instruct the user equipment to activate a reflective quality of service RQ mechanism; and further configured to send a second message to the user equipment, where the second message is used to instruct the user equipment to stop using the RQ mechanism; and a processing module 920, configured to generate the first message and the second message.

Figure 10:
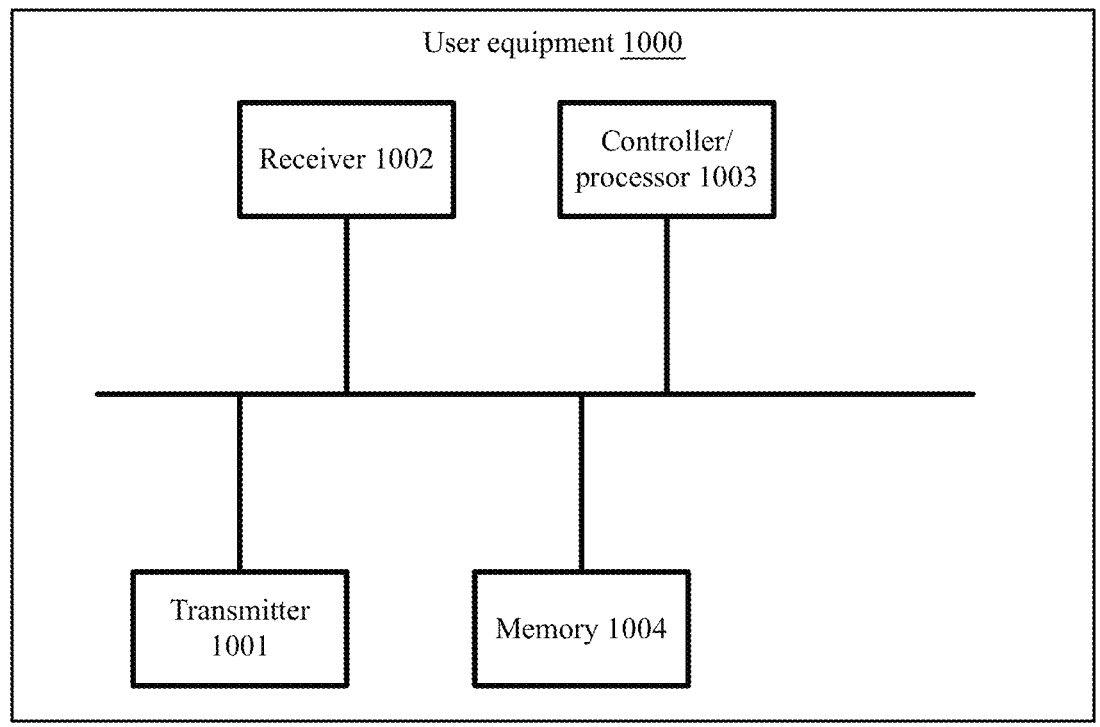
FIG. 10 is a schematic diagram of another user equipment according to an embodiment of the present application.

FIG. 10 is a simplified schematic diagram of a possible design structure of UE in the foregoing embodiments. The UE includes a transmitter 1001, a receiver 1002, a controller/processor 1003, and a memory 1004.

The transmitter 1001 is configured to send a data packet, where the data packet is an uplink data packet. The receiver 1002 is configured to receive related messages sent by the user plane apparatus and the control plane apparatus in the method embodiments, for example, a first message and a second message. The controller/processor 1003 controls and manages an action of the UE and is configured to perform processing implemented by the UE in the foregoing method embodiments. For example, the controller/processor 1003 is configured to support the UE in executing the processes 320, 340, and 360 in FIG. 3 and the processes 420, 440, and 460 in FIG. 4. The memory 1004 is configured to store program code and data of the UE 1000.

Figure 11:
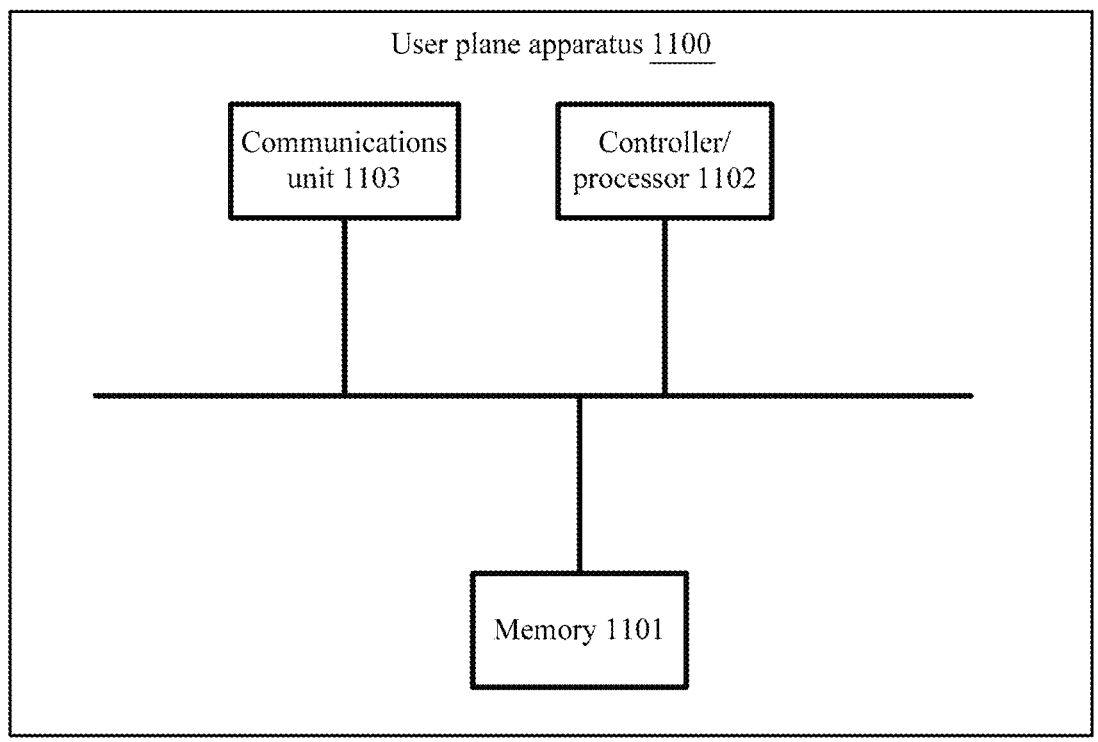
FIG. 11 is a schematic diagram of another user plane apparatus according to an embodiment of the present application.

FIG. 11 is a design block diagram of a user plane apparatus in the foregoing embodiments. The user plane apparatus belongs to a core network, where the core network may refer to an MME, an SGW, a PGW, or any combination thereof. The user plane apparatus may alternatively be an AN.

The user plane apparatus includes a controller/processor 1102, configured to generate related information and perform related processing. For example, the controller/processor 1102 is configured to generate the first message and the second message in the method embodiments and/or perform another process of the technology described in this specification. A memory 1101 is configured to store related program code and data of the user plane apparatus. A communications unit 1103 is configured to support communication with another network apparatus, for example, communication with user equipment and a control plane apparatus in another method embodiment.

Figure 12:
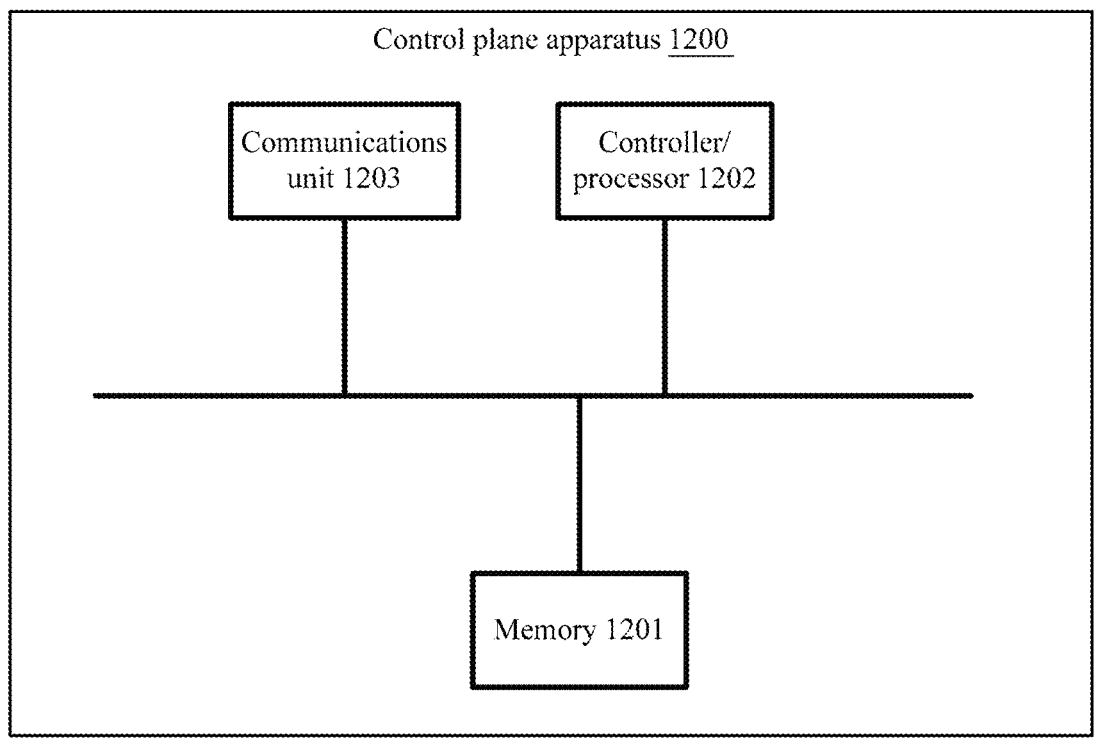
FIG. 12 is a schematic diagram of another control plane apparatus according to an embodiment of the present application.

FIG. 12 is a design block diagram of a control plane apparatus in the foregoing embodiments. The control plane apparatus belongs to a core network, where the core network may refer to an MME, an SGW, a PGW, or any combination thereof. The control plane network element may alternatively be an AN, an SM (session management function) module, or an MM (mobility management function) module.

The control plane apparatus includes a controller/processor 1202 configured to control and manage an action of the control plane apparatus and perform various functions to support a communication service of UE. For example, the controller/processor 1202 is configured to generate the first message and the second message in the method embodiments and/or perform another process of the technology described in this specification. A memory 1201 is configured to store program code and data of the control plane apparatus. A communications unit 1203 is configured to support communication with another network apparatus, for example, communication with user equipment and a user plane apparatus in another method embodiment.

The controller/processor configured to perform functions of the UE or another apparatus in the present application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in the present application. Alternatively, the processor may be a combination of processors implementing a computing function, for example, a combination of one or more microprocessors or a combination of the DSP and a microprocessor.

Method or algorithm steps described in combination with the content disclosed in the present application may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may alternatively be a constituent part of the processor. The processor and the storage medium may be located in an ASIC. In addition, the ASIC may be located in user equipment. Certainly, the processor and the storage medium may exist in the user equipment as discrete components.

It may be clearly understood by a person skilled in the art that, for convenient and brief description, for a detailed working process of the foregoing system, apparatus, and unit, refer to a corresponding process in the foregoing method embodiments, and details are not described herein again. Step numbers in the method embodiments of the present application are used for reference only, and do not limit a time sequence of the steps.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

The foregoing descriptions are merely specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data transmission control method, the method comprising:
   receiving, by user equipment, a first message, wherein the first message is used to instruct the user equipment to activate a reflective quality of service (RQ) mechanism, the first message comprises a reflective quality of service indication (RQI) data packet, the RQI data packet is a data packet carrying an RQI, and the RQI is used to instruct the user equipment to activate the RQ mechanism;
   generating, by the user equipment, an implicit quality of service (QoS) rule according to the RQ mechanism;
   receiving, by the user equipment, a second message from a user plane network element when the QoS rule is updated, wherein the second message is used to instruct the user equipment to stop using the RQ mechanism, and the second message is a non-RQI data packet, wherein the non-RQI data packet is a data packet carrying no RQI; and
   stopping, by the user equipment, using the RQ mechanism, and deleting the implicit QoS rule.

2. The method according to claim 1, wherein the first message and the second message are signaling messages.

3. The method according to of claim 1, wherein:
   the user equipment receives an install explicit QoS rule message, wherein the install explicit QoS rule message is used to instruct the user equipment to process an uplink data packet according to an explicit QoS rule; and
   the user equipment processes the uplink data packet according to the explicit QoS rule.

4. The method according to claim 1, before the deleting, by the user equipment, the implicit QoS rule, comprising:
   receiving, by the user equipment, a remove implicit QoS rule message.

5. An apparatus comprising:
   a processor; and
   a memory coupled to the processor and having program instructions stored thereon which, when executed by the processor, cause the apparatus to perform operations comprising:
   receiving, a first message, wherein the first message is used to instruct the user equipment to activate a reflective quality of service (RQ) mechanism, the first message comprises a reflective quality of service indication (RQI) data packet, the RQI data packet is a data packet carrying an RQI, and the RQI is used to instruct the user equipment to activate the RQ mechanism;
   generating, an implicit quality of service (QoS) rule according to the RQ mechanism;
   receiving, a second message from a user plane network element when the QoS rule is updated, wherein the second message is used to instruct the apparatus to stop using the RQ mechanism, and the second message is a non-RQI data packet, wherein the non-RQI data packet is a data packet carrying no RQI; and
   stopping, using the RQ mechanism, and deleting the implicit QoS rule.

6. The apparatus according to claim 5, wherein the first message and the second message are signaling messages.

7. The apparatus according to claim 5, wherein the operations further comprise:
   receiving an install explicit QoS rule message, wherein the install explicit QoS rule message is used to instruct the user equipment to process an uplink data packet according to an explicit QoS rule; and
   processing the uplink data packet according to the explicit QoS rule.

8. The apparatus according to claim 5, wherein the operations further comprise:
   receiving, a remove implicit QoS rule message.

9. A data transmission system, wherein the system comprises: a user plane network and a control plane network element; wherein:
the control plane network element is configured to send a QoS rule and an updated QoS rule;
the user plane network element is configured to: receive the QoS rule, send a first message to user equipment, wherein the first message is used to instruct the user equipment to activate a reflective quality of service (RQ) mechanism, the first message comprises a reflective quality of service indication (ROI) data packet, the RQI data packet is a data packet carrying an RQI, and the RQI is used to instruct the user equipment to activate the RQ mechanism; and receive the updated QoS rule, send a second message to the user equipment, wherein the second message is indicating the user equipment to stop using the RQ mechanism and delete an implicit quality of service (QoS) rule generated according to the RQ mechanism, and the second message is a non-RQI data packet, wherein the non-RQI data packet is a data packet carrying no RQI.

10. The system according to claim 9, wherein the user plane network element is configured to: after the user plane network element send the first message to the user equipment, the user plane network element receive an uplink data packet, and verify whether the QoS rule is used for the uplink data packet.

11. The system according to claim 9, wherein the user plane network element is configured to: after the user plane network element send the second message to the user equipment, the user plane network element receive an uplink data packet, and verify whether the updated QoS rule is used for the uplink data packet.

12. The system according to claim 9, wherein the first message comprises an RQI data packet, the RQI data packet is a data packet carrying an RQI, and the RQI is used to instruct the user equipment to activate the reflective quality of service RQ mechanism; and
the second message is a non-RQI data packet, wherein the non-RQI data packet is a data packet carrying no RQI.

13. The system according to claim 12, wherein the data packet is a null data packet constructed by the user plane network element.

* * * * *